(12) United States Patent
Shang

(10) Patent No.: US 11,499,881 B2
(45) Date of Patent: Nov. 15, 2022

(54) VARIABLE THICKNESS DIAPHRAGM PRESSURE TRANSDUCER AND METHOD

(71) Applicant: Waters Technologies Corporation, Milford, MA (US)

(72) Inventor: Zongren Shang, Westborough, MA (US)

(73) Assignee: WATERS TECHNOLOGIES CORPORATION, Milford, MA (US)

(*) Notice: Subject to any disclaimer, the term of this patent is extended or adjusted under 35 U.S.C. 154(b) by 76 days.

(21) Appl. No.: 17/046,540

(22) PCT Filed: Apr. 2, 2019

(86) PCT No.: PCT/US2019/025322
§ 371 (c)(1),
(2) Date: Oct. 9, 2020

(87) PCT Pub. No.: WO2019/199520
PCT Pub. Date: Oct. 17, 2019

(65) Prior Publication Data
US 2021/0033478 A1   Feb. 4, 2021

Related U.S. Application Data

(60) Provisional application No. 62/655,520, filed on Apr. 10, 2018.

(51) Int. Cl.
*G01L 9/00* (2006.01)
(52) U.S. Cl.
CPC .......... *G01L 9/0047* (2013.01); *G01L 9/0055* (2013.01)

(58) Field of Classification Search
None
See application file for complete search history.

(56) References Cited

U.S. PATENT DOCUMENTS

| 4,454,771 A | 6/1984 | Shimazoe et al. |
| 5,035,148 A * | 7/1991 | Okada ............... G01L 1/18 338/5 |
| 5,349,867 A | 9/1994 | Park |
| 7,637,174 B2 * | 12/2009 | Hirabayashi .......... G01L 1/26 73/862.041 |

(Continued)

OTHER PUBLICATIONS

International Preliminary Report on Patentability in corresponding PCT Patent Application No. PCT/US2019/025322 dated Oct. 13, 2020. 7 pages.

(Continued)

*Primary Examiner* — Peter J Macchiarolo
*Assistant Examiner* — Jermaine L Jenkins
(74) *Attorney, Agent, or Firm* — Schmeiser, Olsen & Watts LLP; Victor J. Baranowski

(57) ABSTRACT

A diaphragm pressure transducer includes a body having an outer surface and a diaphragm, a strain gauge including a resistive element located on the outer surface, a fluidic inlet, and a fluidic cavity enclosed by the body in fluidic communication with the fluidic inlet, the fluidic cavity having an upper surface. The diaphragm is located between the upper surface of the fluidic cavity and the outer surface of the body. The diaphragm includes a variable thickness across a region defined between the upper surface of the fluidic cavity and the outer surface located below the strain gauge.

19 Claims, 6 Drawing Sheets

(56) References Cited

U.S. PATENT DOCUMENTS 7,703,340 B2 * 4/2010 Sakurai .................. G01L 5/162
73/764
2012/0279309 A1 11/2012 Richards et al.

OTHER PUBLICATIONS

Search Report and Written Opinion for corresponding PCT Patent Application No. PCT/US2019/025322, dated Jul. 16, 2019. 13 pages.
Examination Report in European Patent Application No. 19718878.2 dated May 12, 2022.

* cited by examiner

VARIABLE THICKNESS DIAPHRAGM PRESSURE TRANSDUCER AND METHOD

RELATED APPLICATIONS

This application claims priority to PCT Application No. PCT/US2019/025322, having a filing date of Apr. 2, 2019, which is a non-provisional patent application claiming priority to U.S. Provisional Patent Application No. 62/655,520, filed Apr. 10, 2018, entitled "Pressure Transducer, System and Method," which is incorporated herein by reference.

FIELD OF THE INVENTION

The invention relates generally to pressure transducers. More particularly, the invention relates to diaphragm pressure transducers having variable diaphragm thicknesses, and associated systems and methods.

BACKGROUND

A typical diaphragm pressure transducer includes a full Wheatstone bridge foil strain gage having grids mounted directly above a cavity having a suitable web thickness or diaphragm to allow for measurable deflection of intermediate housing material located between the pressurized cavity and the strain gage. The diaphragm or web thickness remains constant across the area of the cavity. In these prior art diaphragm pressure transducers, the strain at different single points on the grids may be different when the cavity is pressurized by a fluid due to the mechanical structure of the cavity and diaphragm. The overall strain output of the strain gauge is based on the strain across the entire area of the grid.

Thus, a diaphragm pressure transducer configured to maximize strain where the grid is located, and associated systems and methods would be well received in the art.

SUMMARY

In one disclosed embodiment, a diaphragm pressure transducer comprises: a body having an outer surface and a diaphragm; a strain gauge including a resistive element located on the outer surface; a fluidic inlet; and a fluidic cavity enclosed by the body in fluidic communication with the fluidic inlet, the fluidic cavity having an upper surface, wherein the diaphragm is located between the upper surface of the fluidic cavity and the outer surface of the body, and wherein the diaphragm includes a variable thickness across a region defined between the upper surface of the fluidic cavity and the outer surface located below the strain gauge.

Additionally or alternatively, the fluidic cavity includes a circular cross section and wherein the region of the diaphragm is a circular region having a region radius, and wherein the region of the diaphragm includes a circumferential channel in the upper surface of the fluidic cavity having an outer channel radius and an inner channel radius, the circumferential channel reducing a thickness of the diaphragm relative to a portion of the circular region not characterized by the circumferential channel.

Additionally or alternatively, the outer channel radius of the circumferential channel is less than the region radius of the circular region.

Additionally or alternatively, the circular region includes an inner region located within the circumferential channel and an outer region located outside the circumferential channel, wherein the inner region and the outer region have substantially equal thicknesses.

Additionally or alternatively, the resistive element includes a circumferential grid having an outer grid radius and an inner grid radius, and wherein the circumferential channel is located below the circumferential grid.

Additionally or alternatively, the inner grid radius is greater than the outer channel radius.

Additionally or alternatively, the resistive element includes an inner circumferential grid located within the circumferential grid.

Additionally or alternatively, the body is a two-part diffusion bonded body.

Additionally or alternatively, the variable thickness is configured to increase strain output by at least 15% relative to a diaphragm pressure transducer having the same structure other than having a constant thickness instead of a variable thickness.

Additionally or alternatively, the fluidic cavity includes a circular cross section and wherein the region is a circular region having a region radius, and wherein the region includes a circumferential channel in the outer surface of the body having an outer channel radius and an inner channel radius, the circumferential channel of the diaphragm having a reduced thickness relative to the rest of the circular region.

In another disclosed embodiment, a method comprises: providing a diaphragm pressure transducer structure having a body having an outer surface and a diaphragm; creating a variable diaphragm thickness in the diaphragm of the body, the variable diaphragm thickness configured to maximize strain output; and manufacturing a first diaphragm pressure transducer from the diaphragm pressure transducer structure, the first diaphragm pressure transducer including: a strain gauge including a resistive element located on the outer surface; a fluidic inlet; and a fluidic cavity enclosed by the body in fluidic communication with the fluidic inlet, the fluidic cavity having an upper surface.

Additionally or alternatively, the method further includes: testing a plurality of variable diaphragm thickness configurations for the diaphragm pressure transducer structure, the plurality of diaphragm thickness configurations including varying thicknesses of the diaphragm across a region defined between the upper surface of the fluidic cavity and the outer surface located below the strain gauge, the testing including measuring strain output; and selecting a variable diaphragm thickness configuration that maximizes strain output Additionally or alternatively, the body further includes a first body portion and a second body portion, and the method further includes: forming the fluidic cavity in at least one of the first body portion and the second body portion; and diffusion bonding the first body portion to the second body portion to assemble the body.

Additionally or alternatively, the forming the fluidic cavity further includes removing material from the first body portion to form the variable diaphragm thickness configuration.

Additionally or alternatively, the forming the fluidic cavity further includes: fashioning a circular cross section; and fashioning a circumferential channel in the upper surface of the fluidic cavity having an outer channel radius and an inner channel radius, the circumferential channel reducing the thickness of the diaphragm relative to a portion of the circular region not characterized by the circumferential channel.

Additionally or alternatively, the method further includes attaching the resistive element to the outer surface, wherein the resistive element is a circumferential grid having an outer grid radius and an inner grid radius, and wherein the circumferential channel is located below the resistive element.

Additionally or alternatively, the method further includes placing the first diaphragm pressure transducers at a location along a fluid path; and detecting pressure of a fluid in the fluid path with the first diaphragm pressure transducer.

Additionally or alternatively, the method further includes maximizing the strain output from the first diaphragm pressure transducer with the variable diaphragm thickness configuration.

Additionally or alternatively, the testing is performed using a computer simulation application with computer models of the diaphragm pressure transducer structure and the plurality of variable diaphragm thickness configuration.

Additionally or alternatively, the method further includes manufacturing a second diaphragm pressure transducer having the diaphragm pressure transducer structure and the variable diaphragm thickness configuration that maximizes strain output; placing the first and second diaphragm pressure transducers at different points along a fluid path; and measuring fluid flow rate using the first and second diaphragm pressure transducers.

In another disclosed embodiment, a diaphragm pressure transducer comprises: a body having an outer surface and a diaphragm; a strain gauge including a resistive element located on the outer surface; a fluidic inlet; and a fluidic cavity enclosed by the body in fluidic communication with the fluidic inlet, the fluidic cavity extending between a bottom surface and an upper surface, the upper surface being located a distance from the bottom surface, wherein the distance varies across the area of the fluidic cavity, wherein the diaphragm is located between the upper surface of the fluidic cavity and the outer surface of the body.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Figure 1:
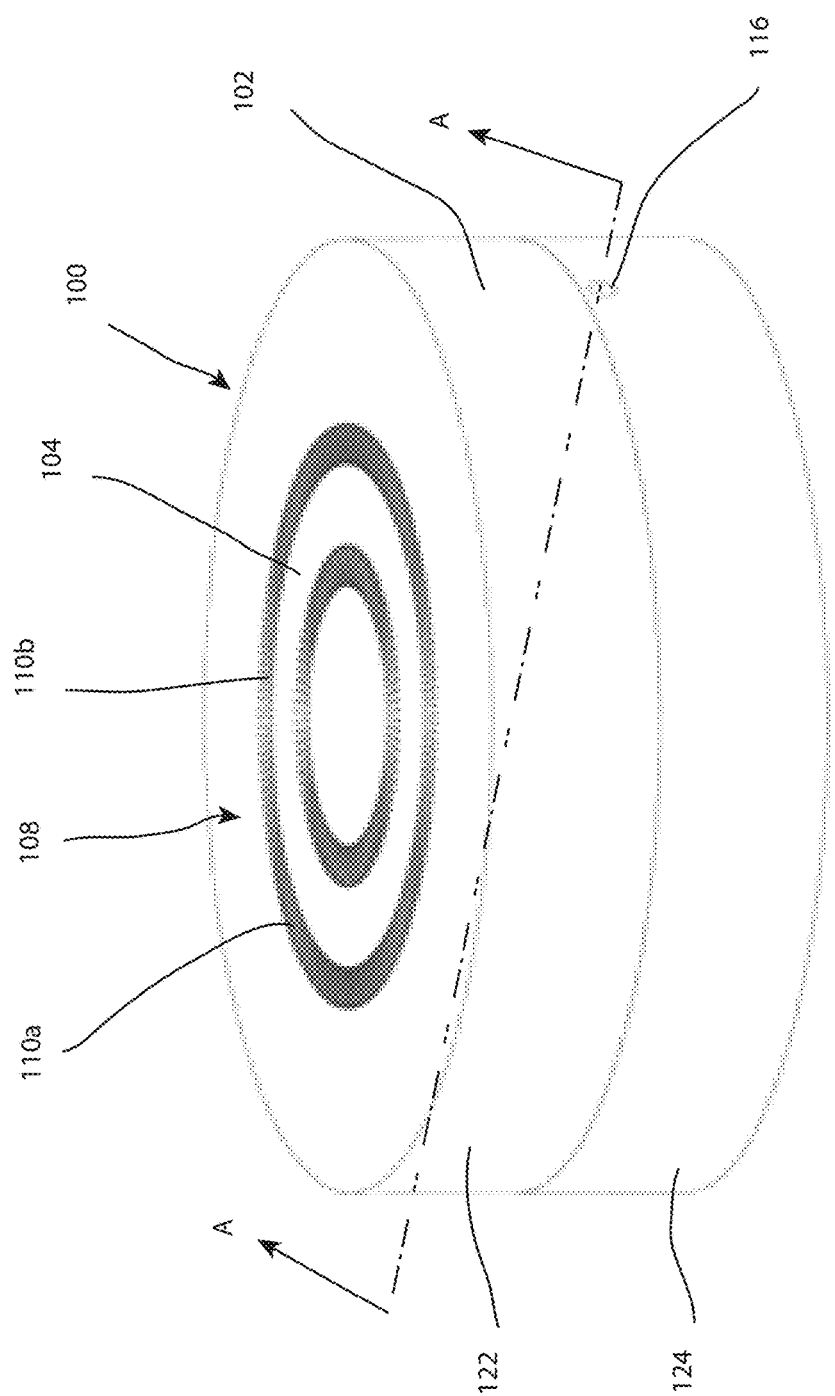
FIG. 1 depicts a perspective view of a diaphragm pressure transducer in accordance with one embodiment.
Figure 2:
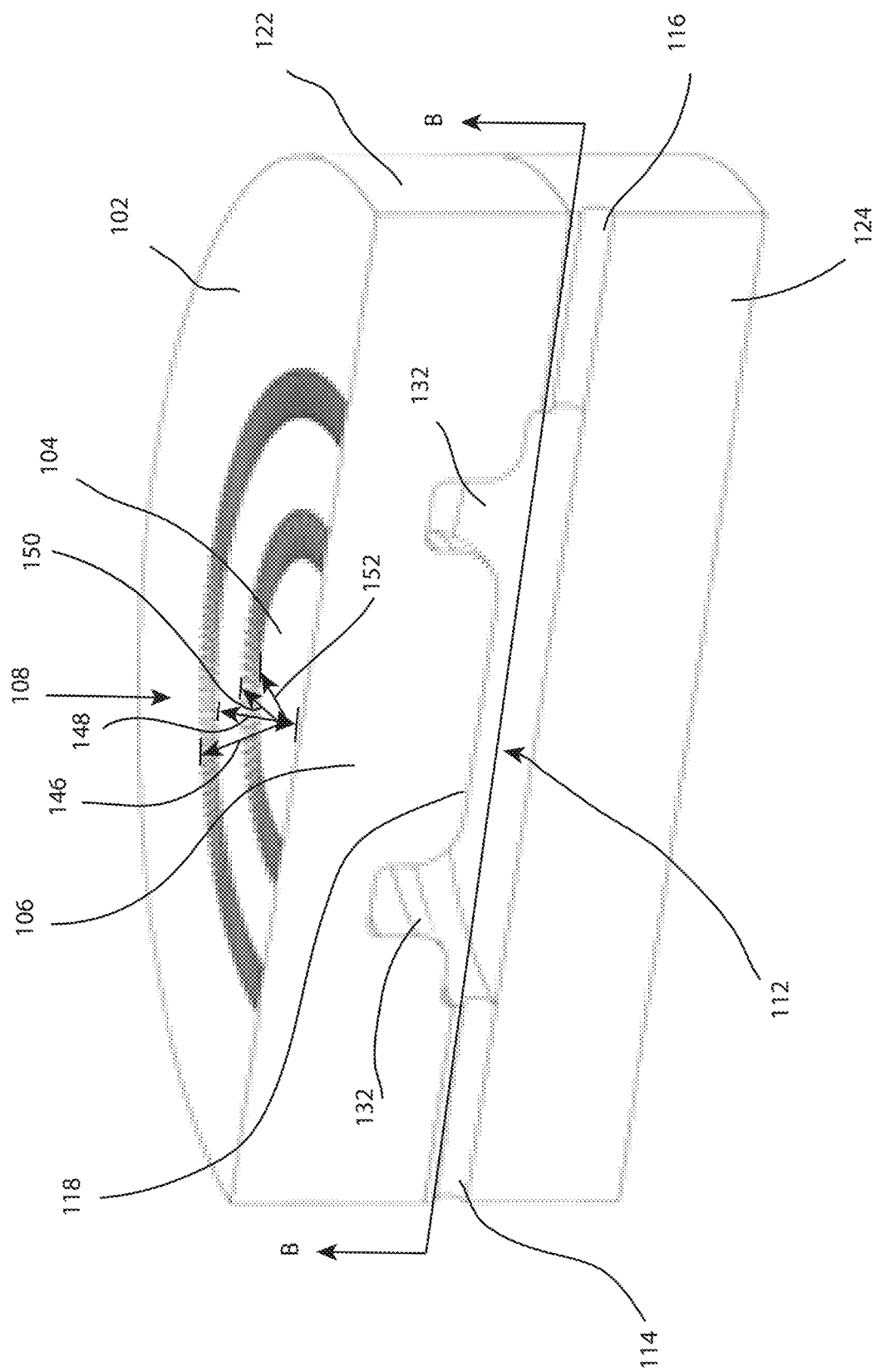
FIG. 2 depicts a perspective cutaway view of the diaphragm pressure transducer of FIG. 1 taken at arrows A-A in accordance with one embodiment.
Figure 3:
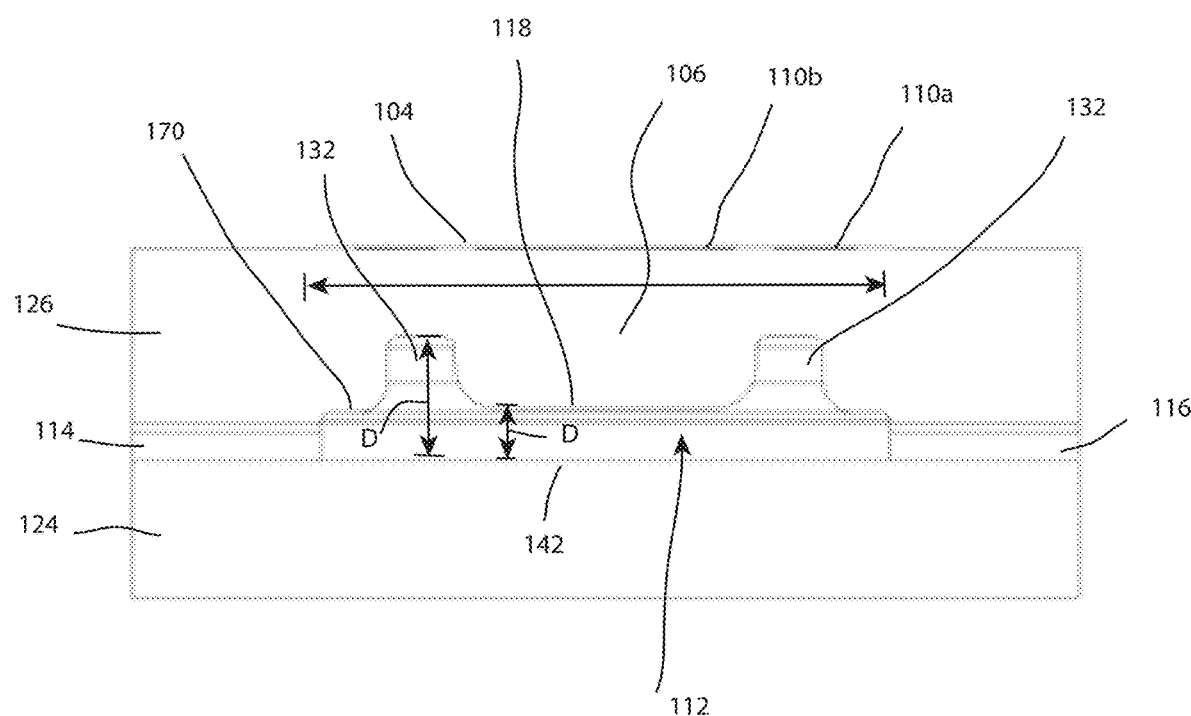
FIG. 3 depicts a side cutaway view of the diaphragm pressure transducer of FIGS. 1-2, taken at arrows A-A in accordance with one embodiment.
Figure 4:
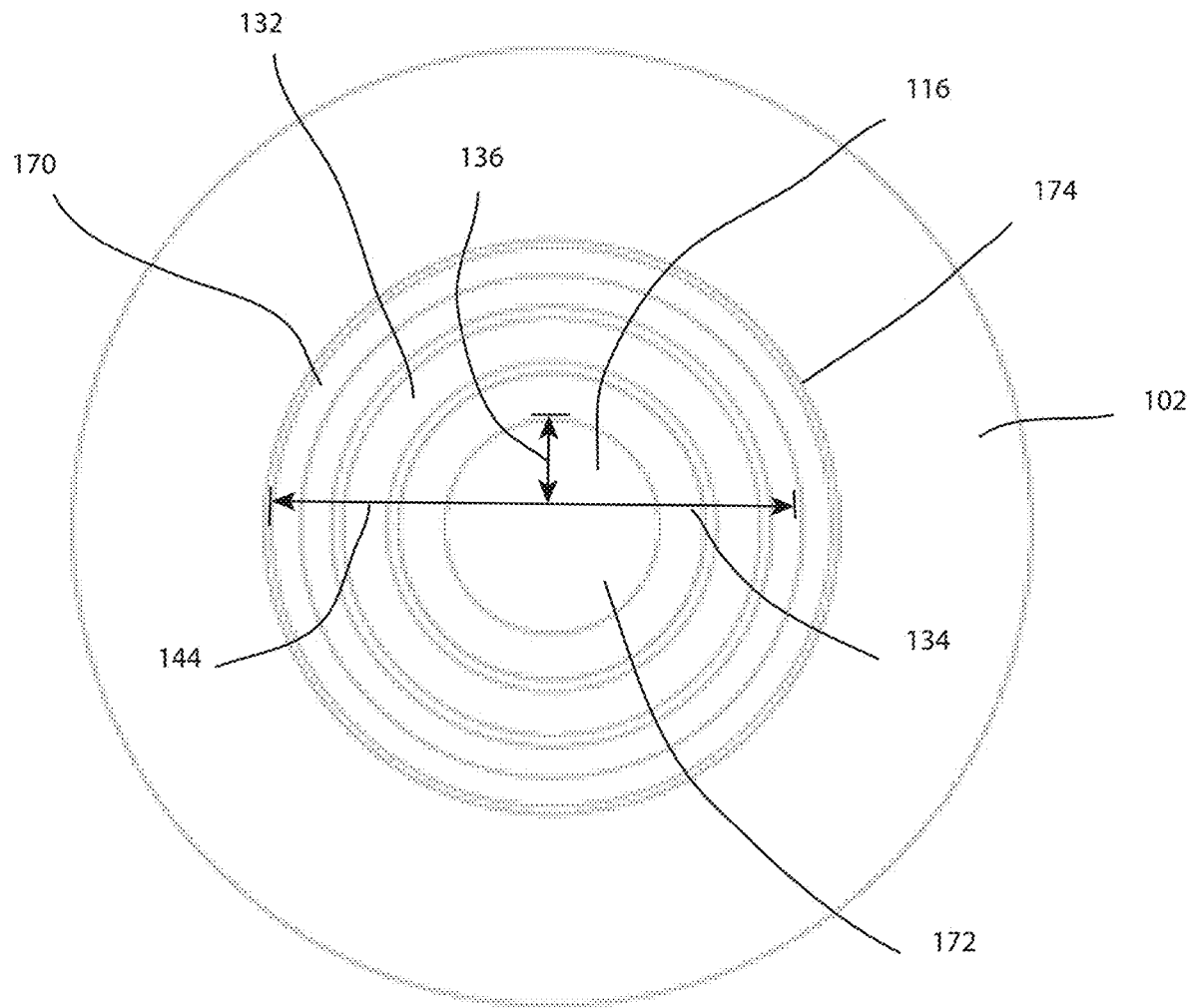
FIG. 4 depicts an upward facing cutaway view of an upper surface of a cavity of the diaphragm pressure transducer of FIGS. 1-3, taken at arrows B-B in accordance with one embodiment.

Referring first to FIGS. 1-4, FIG. 1 depicts a perspective view of a diaphragm pressure transducer 100. FIG. 2 depicts a perspective cutaway view of the diaphragm pressure transducer 100 taken at arrows A-A, and FIG. 3 depicts a side cutaway view of the diaphragm pressure transducer 100 taken at arrows A-A. FIG. 4 depicts an upward facing cutaway view of the diaphragm pressure transducer 100 taken at arrows B-B.

The diaphragm pressure transducer 100 includes a body 102 having an outer surface 104 and a diaphragm 106. The diaphragm pressure transducer 100 includes a strain gauge 108 including a first resistive element 110a and a second resistive element 110b located on the outer surface 104. A fluidic cavity 112 is enclosed by the body 102. The fluidic cavity 112 is shown in fluidic communication with a fluidic inlet 114 and a fluidic outlet 116. The fluidic inlet 114 and the fluidic outlet 116 may each be fluidic ports configured to receive or expel the flow of fluid. The fluidic inlet 114 may be an outlet and the fluidic outlet 116 may be an inlet depending on flow direction. In some embodiment, a single fluidic inlet 114 is contemplated acting as both conduit for receiving a fluid and removing the fluid from the fluidic cavity 112.

The body 102 of the diaphragm pressure transducer 100 may include an upper body portion 122 and a lower body portion 124. The upper body portion 122 and the lower body portion 124 may be combined to create the joined body 102 by diffusion bonding, welding, or otherwise attaching the body portions 122, 124 together. In one embodiment, the upper body portion 122 and the lower body portion 124 may each be made of the same material. In other embodiments, the upper body portion 122 may be made of a different material as the lower body portion 124. The material of the upper body portion 122 may accommodate for machining, removing or otherwise manufacturing the upper body portion 122 to include the variable thickness in the diaphragm 106. The body 102, including the upper body portion 122 and the lower body portion 124, may be made of one or more materials selected from the group consisting of steel, stainless steel, aluminum, titanium, zinc, nickel, Invar or the like. Still other metallic and nonmetallic materials are contemplated for construction of some or all of the body 102, such as composites or plastics.

As shown in FIGS. 2 and 3, the diaphragm 106 is disposed or located between the outer surface 104 of the body 102 and an upper surface 118 of the fluidic cavity 112. In other words, the diaphragm 106 is the specific region of the body 102 located above the upper surface 118 of the fluidic cavity 112 and below the outer surface 104. In one embodiment, the diaphragm 106 may be the portion of the upper body portion 122 that is directly located above the fluidic cavity 112. In contrast, the portion directly above the fluidic inlet 114 and the fluidic outlet 116 in the upper body portion 122 may not be considered the diaphragm 106. When the fluidic cavity 112 is subjected to a pressurized state, the diaphragm 106 experiences a strain or expansion measurable by the strain gauge 108 attached to the upper surface 118. The relationship between the strain experienced at the strain gauge 108 and the pressure in the fluidic cavity 112 may provide for a method of measuring or determining pressure in the fluidic cavity 112, as described herein below.

The outer surface 104 of the body 102 is a flat surface in the embodiment shown, configured to receive the resistive elements 110 of the strain gauge 108. In other embodiments, the outer surface 104 of the body 102 may include channels, ridges, concavities, or the like and may not be flat, as described herein below. The resistive elements 110a, 110b may be one or more outer grids and one or more inner grids. The resistive elements 110 may be electrically connected to form a Wheatstone bridge. The Wheatstone bridge may include at least two active grids and at least two passive grids.

The resistive elements 110a, 110b may each include resistors patterned onto a thin carrier backing attached directly to the flat surface 104. The thin carrier backing may include an adhesive layer configured to attach the grids of the resistive elements 110a, 110b to the flat surface 104. The resistive elements 110a, 110b may each be thin metallic wires of foil having a particular electrical resistance that changes with the strain on the resistive elements 110a, 110b. The resistive elements 110a, 110b may each be in operable contact with the body 102 through the thin carrier backing. "Operable contact" herein shall mean a state where the strain experienced by the body 102 is transferred to the resistive elements 110a, 110b to change the electrical resistance of the resistive elements 110a, 110b. In other words, the thin carrier backing 130 may be located between the resistive elements 110a, 110b and the body 102 despite the resistive elements 110a, 110b being operably contacting the body 102 for the purposes of measuring strain.

As shown in FIG. 4, the fluidic cavity 112 includes a circular cross section. The upper surface 118 of the fluidic cavity 112 and the diaphragm 106 located above the upper surface are circular regions having a region radius 144. The diaphragm 106 includes a circumferential channel 132 located in the upper surface 118 of the fluidic cavity 112. The circumferential channel 132 includes an outer channel radius 134 and an inner channel radius 136. As shown, the outer channel radius 134 may be considered the location at which the channel begins to gradually reduce the thickness of the diaphragm 106. Likewise, the inner channel radius 136 may be considered the location at which upper surface 118 of the fluidic cavity is completely flat. The circumferential channel 132 reduces the thickness of the diaphragm relative to a portion of the circular area of the fluidic cavity 112 compared to the rest of the circular area not defined by the circumferential channel 132. For example, an outer portion 170 of the upper surface 118 having a radius less than the region radius 144 but greater than the outer channel radius 134 may include a constant depth (or cavity thickness) that matches the depth (or cavity thickness) of an inner portion 172 having a radius less than the inner channel radius 136.

The upper surface 118 of the fluidic cavity 112 is not flat. Thus, the diaphragm 106 includes a variable thickness across a region 120 defined between the upper surface 118 of the fluidic cavity 112 and the outer surface 104 located below the strain gauge 108. The fluidic cavity 112 may extend between a bottom surface 142 of the fluidic cavity 112 and the upper surface 118. The upper surface 118 may be located a distance D from the bottom surface 142. The distance D may vary across the area of the fluidic cavity 112.

The embodiment shows a rounded corner 174 at the outer region radius 144 at the upper surface 118. Rounded outer edges such as the rounded corner 174 are considered consistent with a "flat" upper surface or an upper surface of a fluidic cavity in which the diaphragm has a constant thickness. In other words, rounded corners, such as the rounded corner 174, are not considered features that define a variable thickness of the diaphragm 106. Instead the circumferential channel 136 defines the variable thickness in the embodiment shown.

The circumferential channel 132 is shown located within the outer confines of the circular cross section of the fluidic cavity 112 and does not define the outer circumference of the circular cross section of the fluidic cavity 112. In other words, an outer channel radius 134 is less than the region radius 144 of the circular region of the fluidic cavity 112. Thus, the circular region of the fluidic cavity 112 includes an inner region 138 and an outer region 140. The inner region 138 may be located within the circumferential channel 132 and the outer region 140 may be located outside the circumferential channel 132. The thickness of the diaphragm 106 above the inner region 138 and the outer region 140 is substantially equal in the embodiment shown.

The outer grids of the resistive element 110a may include an outer grid radius 146 and an inner grid radius 148. The inner grids of the resistive element 110b may include an outer grid radius 150 and an inner grid radius 152. The circumferential channel 132 may be located directly below the outer resistive element 110a. However, the inner grid radius 148 may be greater than the outer channel radius 134 of the circumferential channel 132. In other embodiments, the outer resistive element 110a may align directly above the circumferential channel 132 such that the outer grid radius 146 of the outer resistive element 110a may be the same as the outer channel radius 134. The location of the outer resistive element 11a relative to the circumferential channel 132 may be optimized such that the maximum strain of the outer surface 104 of caused by the pressure in the fluidic cavity 112 occurs at the location of the outer resistive element 110a.

The circumferential channel 132 is shown extending in a complete 360° circle. However, other embodiments are contemplated where the circumferential channel 132 extends in a broken circle having portions in the circle where the diaphragm 106 retains its full thickness. For example, the full thickness portions may be directly below where there is no resistive element in the case of a partial grid or partial grating. In still other embodiments, the variable thickness may not comprise a circumferential channel, but may include a more gradual thickness variation across the area of the diaphragm 106. Other embodiments that define a variable thickness of the diaphragm 106 may be created by placing a channel in the outer surface 104 of the upper portion 122 of the body 102, where the outer resistive elements 110a may be located within such a channel. Still other embodiments that define a variable thickness of the diaphragm 106 may be created by boring, machining or otherwise removing material from the surface 104 of the upper portion 122 of the body 102.

The variable thickness created by the circumferential channel 132 in the fluidic cavity 112 may be configured to increase strain output by at least 15% relative to a second diaphragm pressure transducer (not shown) having the same structure as the pressure transducer 100 other than the second diaphragm pressure transducer having a constant thickness instead of a variable thickness. In other embodiments, the variable thickness created by the circumferential channel 132 in the fluidic cavity 112 may be configured to increase strain output by at least 20% or 25% relative to the second diaphragm pressure transducer.

Figure 5:
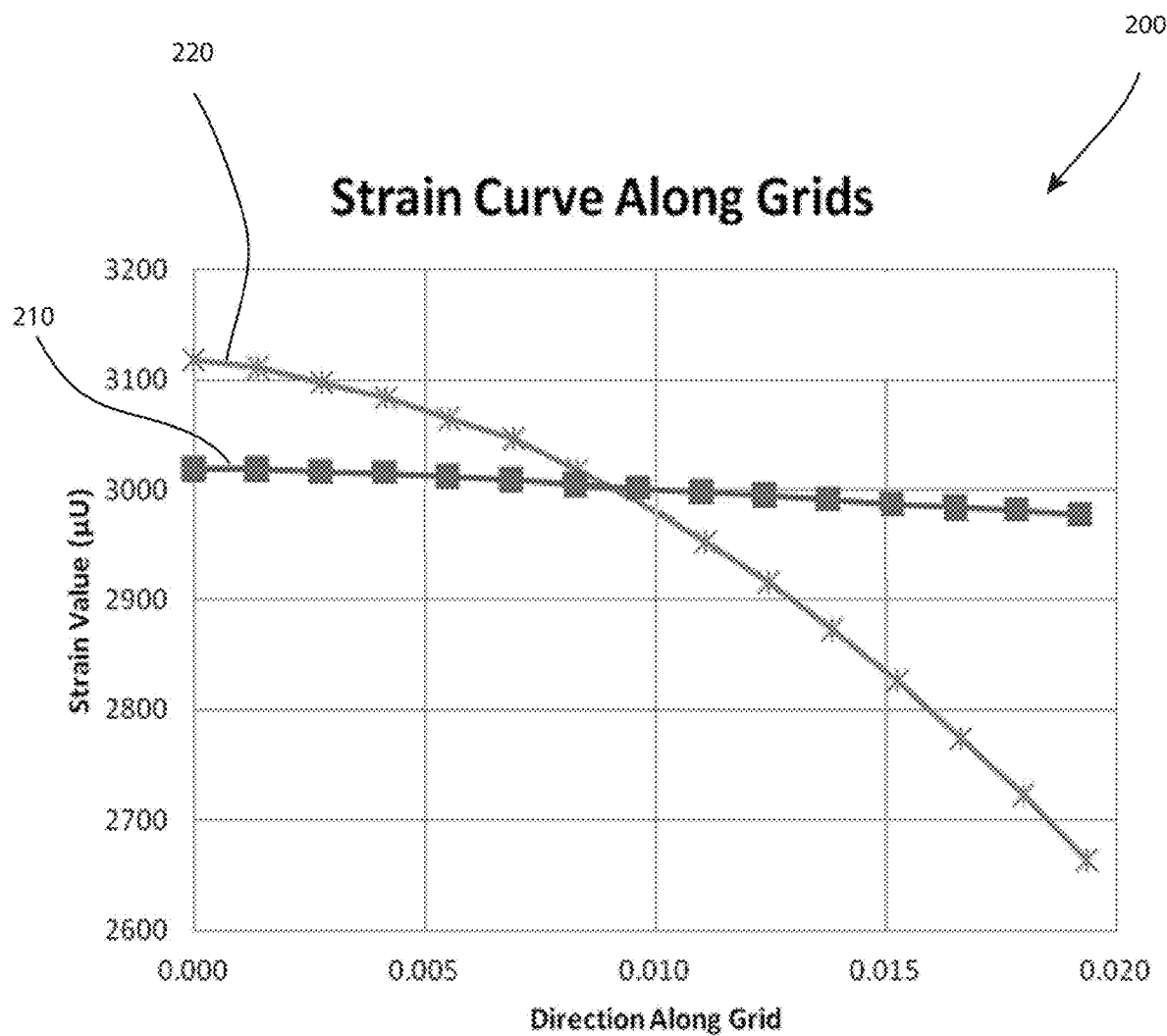
FIG. 5 depicts a graph of a diaphragm pressure transducer having a strain gauge with a constant diaphragm thickness compared with the pressure transducer of FIGS. 1-3 having a variable diaphragm thickness in accordance with one embodiment.

Referring to FIG. 5, a graph 200 of the diaphragm pressure transducer 100 is shown having the variable thickness diaphragm 106 compared to a pressure transducer having the same properties, and subject to the same internal cavity fluidic pressure, as the diaphragm pressure transducer 100 except having a constant thickness diaphragm. The graph 200 plots strain value along the y-axis vs. direction on the grid on the x-axis. In particular, plot 210 plots strain value of the variable thickness diaphragm pressure transducer 100. In plot 210, the strain value remains at about 3000 microstrain units (μU) at every location on the grid tested. In contrast, the plot 220 of the constant thickness diaphragm pressure transducer starts above 3100 μU but quickly drops below 3000 μU to 2650 μU across the grid. In aggregate, the variable thickness diaphragm pressure transducer 100 includes higher numbers, indicating that the variable thickness diaphragm pressure transducer 100 is more sensitive to strain compared to the constant diaphragm pressure transducer having the same properties and subject to the same fluidic pressure.

Embodiments of diaphragm pressure transducers contemplated herein may include various diaphragm dimensions, with thicknesses that vary in various ways and may include various concavities, channels, dents, depressions, dints, holes, hollows, indentations, recesses or the like formed into the upper surface of the cavity. Still other embodiments may have various concavities, channels, dents, depressions, dints, holes, hollows, indentations, recesses or the like formed into the outer surface of the diaphragm. Still other embodiments may add material to the cavity, outer surface, or diaphragm to create a variable thickness. Whatever the embodiment, the variable thickness of the diaphragm may be configured to increase and/or maximize the strain output across the entirety of the grid or grating.

Figure 6:
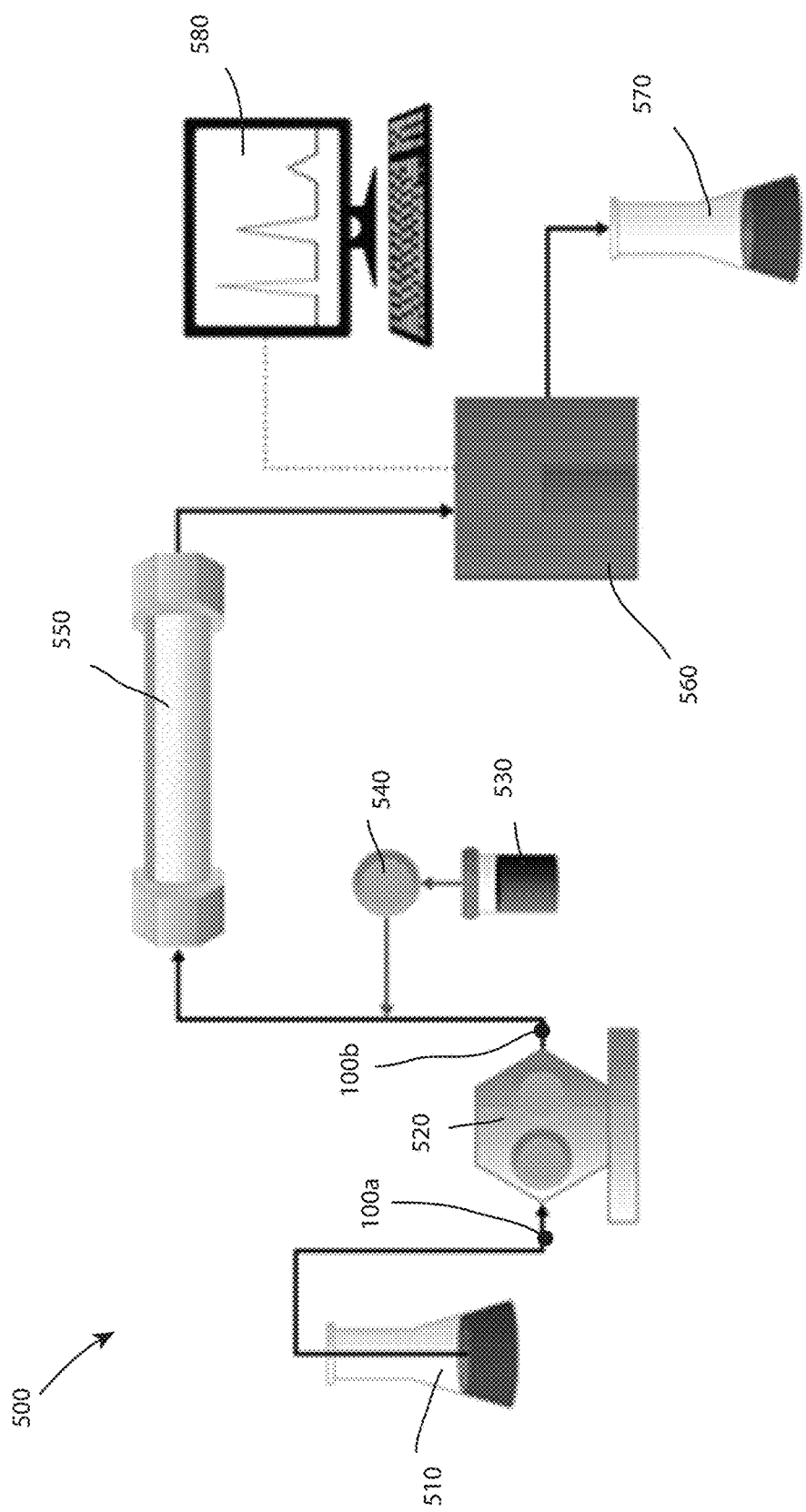
FIG. 6 depicts a liquid chromatography system including a plurality of the diaphragm pressure transducer of FIGS. 1-4, in accordance with one embodiment.

FIG. 6 depicts a schematic of a liquid chromatography system 500 in accordance with one embodiment. The liquid chromatography system 500 may include various features such as a solvent or mobile phase reservoir 510, a pump, solvent manager or other solvent delivery system 520, a sample container 530 with a sample injector or sample manager 540, a liquid chromatography column 550, a detector 560, a waste reservoir or system 570 and a control or computer system or other chromatogram 580. The liquid chromatography system 500 may be a fluidic system configured to provide a mixed liquid comprising both the solvent 510 and the sample 530 to the separation column 550 for separation and analysis by the detector. The liquid chromatography system 500 may be a high performance liquid chromatography system, a gas chromatography system, or the like. One or more of the pressure transducers described herein may be included in the liquid chromatography system 500 to detect fluid pressure.

One or more of the diaphragm pressure transducers described herein, such as the diaphragm pressure transducer 100, may be included in the liquid chromatography system 500 before, after and/or within the pump, solvent manager or solvent delivery system 520. As shown, a first diaphragm pressure transducer 100a and a second diaphragm pressure transducer 100b, which may each include some or all of the structure described hereinabove with respect the diaphragm pressure transducer 100, may be placed at different points along the fluid path of the liquid chromatography system 500. In this embodiment, the accurately measuring the pressure at the two locations with the first and second diaphragm pressure transducers 100a, 100b may be utilized by a flow rate measuring system to determine flow rate of a fluid through the fluid path.

Other locations for placing diaphragm pressure transducers in the system that are consistent with the embodiments described herein are also contemplated. Furthermore, other fluid systems besides liquid chromatography systems may incorporate pressure transducers consistent with embodiments described herein.

Methods of designing a diaphragm type pressure transducer and/or detecting pressure are also contemplated. In one embodiment, a method includes providing a diaphragm pressure transducer structure, such as the upper body portion 122 and/or the body 102, having a body, such as the body 102 and/or the upper body portion 122, having an outer surface, such as the outer surface 104, and a diaphragm, such as the diaphragm 106. The method may include creating a variable diaphragm thickness in the diaphragm of the body, the variable diaphragm thickness configured to maximize strain output. The method may include manufacturing a first diaphragm pressure transducer, such as the diaphragm pressure transducer 100, from the diaphragm pressure transducer structure, the first diaphragm pressure transducer including a strain gauge, such as the strain gauge 108, including a resistive element, such as the resistive elements 110, located on the outer surface, a fluidic inlet, such as the fluidic inlet 114, and a fluidic cavity, such as the fluidic cavity 112, enclosed by the body in fluidic communication with the fluidic inlet, the fluidic cavity having an upper surface, such as the upper surface 118.

The method may include testing a plurality of variable diaphragm thickness configurations for the diaphragm pressure transducer structure, the plurality of diaphragm thickness configurations including varying thicknesses of the diaphragm across a region defined between the upper surface of the fluidic cavity and the outer surface located below the strain gauge, the testing including measuring strain output. The method may include selecting a variable diaphragm thickness configuration that maximizes strain output The plurality of diaphragm thickness configurations may include varying thicknesses of the diaphragm across a region, such as the region 120, defined between the upper surface of the fluidic cavity and the outer surface located below the strain gauge. The method may include selecting a variable diaphragm thickness configuration that maximizes strain output and manufacturing a first diaphragm pressure transducer having the pressure transducer structure and the variable diaphragm thickness configuration that maximizes strain output.

The body may further include a first body portion, such as the upper body portion 122, and a second body portion, such as the lower body portion 124. The method may further include forming the fluidic cavity in at least one of the first body portion and the second body portion and diffusion bonding the first body portion to the second body portion to assemble the body. Forming the fluidic cavity may further include removing material from the first body portion to form the variable diaphragm thickness configuration. Forming the fluidic cavity may further include fashioning a circular cross section, and fashioning a circumferential channel, such as the circumferential channel 132, in the upper surface of the fluidic cavity having an outer channel radius, such as the outer channel radius 134, and an inner channel radius, such as the inner channel radius 136, the circumferential channel reducing the thickness of the diaphragm relative to a portion of the circular region not characterized by the circumferential channel. The method may further include attaching the resistive element to the outer surface. The resistive element may be a circumferential grid, such as the one or more outer grids 126, having an outer grid radius, such as the outer grid radius 146, and an inner grid radius, such as the inner grid radius 148. The circumferential channel may be located below the resistive element.

The method may further include placing the first diaphragm pressure transducers at a location along a fluid path and detecting pressure of a fluid in the fluid path with the first diaphragm pressure transducer. Further, the method may include maximizing the strain output from the first diaphragm pressure transducer with the variable diaphragm thickness configuration.

Methods may further include manufacturing a second diaphragm pressure transducer having the diaphragm pressure transducer structure and the variable diaphragm thickness configuration that maximizes strain output. Methods may include placing the first and second diaphragm pressure transducers at different points along a fluid path, and measuring fluid flow rate using the first and second diaphragm pressure transducers.

While the invention has been shown and described with reference to specific embodiments, it should be understood by those skilled in the art that various changes in form and detail may be made therein without departing from the spirit and scope of the invention as recited in the accompanying claims. For example, various embodiments of the diaphragm pressure transducer are described as including a circumferential channel, it should be recognized that in other embodiments the diaphragm pressure transducer can be configured to have a variable thickness of different shapes, depths, or dimensions as the embodiments depicted in the figures.

What is claimed:

1. A diaphragm pressure transducer comprising:
   a body having an outer surface and a diaphragm;
   a strain gauge including a resistive element located on the outer surface;
   a fluidic inlet; and
   a fluidic cavity enclosed by the body in fluidic communication with the fluidic inlet, the fluidic cavity having an upper surface,
   wherein the diaphragm is located between the upper surface of the fluidic cavity and the outer surface of the body, and wherein the diaphragm includes a variable thickness across a region defined between the upper surface of the fluidic cavity and the outer surface located directly below the resistive element of the strain gauge.

2. The diaphragm pressure transducer of claim 1, wherein the fluidic cavity includes a circular cross section and wherein the region of the diaphragm is a circular region having a region radius, and wherein the region of the diaphragm includes a circumferential channel in the upper surface of the fluidic cavity having an outer channel radius and an inner channel radius, the circumferential channel reducing a thickness of the diaphragm relative to a portion of the circular region not characterized by the circumferential channel.

3. The diaphragm pressure transducer of claim 2, wherein the outer channel radius of the circumferential channel is less than the region radius of the circular region.

4. The diaphragm pressure transducer of claim 3, wherein the circular region includes an inner region located within the circumferential channel and an outer region located outside the circumferential channel, wherein the inner region and the outer region have substantially equal thicknesses.

5. The diaphragm pressure transducer of claim 2, wherein the resistive element includes a circumferential grid having an outer grid radius and an inner grid radius, and wherein the circumferential channel is located below the circumferential grid.

6. The diaphragm pressure transducer of claim 5, wherein the inner grid radius is greater than the outer channel radius.

7. The diaphragm pressure transducer of claim 2, wherein the resistive element includes an inner circumferential grid located within the circumferential grid.

8. The diaphragm pressure transducer of claim 1, wherein the body is a two-part diffusion bonded body.

9. The diaphragm pressure transducer of claim 1, wherein the variable thickness is configured to increase strain output by at least 15% relative to a diaphragm pressure transducer having the same structure other than having a constant thickness instead of a variable thickness.

10. The diaphragm pressure transducer of claim 1, wherein the fluidic cavity includes a circular cross section and wherein the region is a circular region having a region radius, and wherein the region includes a circumferential channel in the outer surface of the body having an outer channel radius and an inner channel radius, the circumferential channel of the diaphragm having a reduced thickness relative to the rest of the circular region.

11. A method comprising:
   providing a diaphragm pressure transducer structure having a body having an outer surface and a diaphragm;
   testing a plurality of variable diaphragm thickness configurations for the diaphragm pressure transducer structure, the plurality of diaphragm thickness configurations including varying thicknesses of the diaphragm across a region defined between an upper surface of a fluidic cavity and the outer surface located below a strain gauge, the testing including measuring strain output;
   selecting a variable diaphragm thickness configuration that maximizes strain output;
   creating a variable diaphragm thickness in the diaphragm of the body, the variable diaphragm thickness configured to maximize strain output; and
   manufacturing a first diaphragm pressure transducer from the diaphragm pressure transducer structure, the first diaphragm pressure transducer including:
      the strain gauge including a resistive element located on the outer surface;
      a fluidic inlet; and
      the fluidic cavity enclosed by the body in fluidic communication with the fluidic inlet, the fluidic cavity having the upper surface.

12. The method of claim 11, wherein the body further includes a first body portion and a second body portion, the method further comprising:
   forming the fluidic cavity in at least one of the first body portion and the second body portion; and
   diffusion bonding the first body portion to the second body portion to assemble the body.

13. The method of claim 12, wherein the forming the fluidic cavity further includes removing material from the first body portion to form the variable diaphragm thickness configuration.

14. The method of claim 13, wherein the forming the fluidic cavity further includes:
fashioning a circular cross section; and
fashioning a circumferential channel in the upper surface of the fluidic cavity having an outer channel radius and an inner channel radius, the circumferential channel reducing the thickness of the diaphragm relative to a portion of the circular region not characterized by the circumferential channel.

15. The method of claim 14, further comprising attaching the resistive element to the outer surface, wherein the resistive element is a circumferential grid having an outer grid radius and an inner grid radius, and wherein the circumferential channel is located below the resistive element.

16. The method of claim 11, further comprising:
placing the first diaphragm pressure transducers at a location along a fluid path; and
detecting pressure of a fluid in the fluid path with the first diaphragm pressure transducer.

17. The method of claim 16, further comprising maximizing the strain output from the first diaphragm pressure transducer with the variable diaphragm thickness configuration.

18. The method of claim 11, wherein the testing is performed using a computer simulation application with computer models of the diaphragm pressure transducer structure and the plurality of variable diaphragm thickness configuration.

19. The method of claim 11, further comprising:
manufacturing a second diaphragm pressure transducer having the diaphragm pressure transducer structure and the variable diaphragm thickness configuration that maximizes strain output;
placing the first and second diaphragm pressure transducers at different points along a fluid path; and
measuring fluid flow rate using the first and second diaphragm pressure transducers.

* * * * *

UNITED STATES PATENT AND TRADEMARK OFFICE
CERTIFICATE OF CORRECTION

| | |
|---|---|
| PATENT NO. | : 11,499,881 B2 |
| APPLICATION NO. | : 17/046540 |
| DATED | : November 15, 2022 |
| INVENTOR(S) | : Zongren Shang |

It is certified that error appears in the above-identified patent and that said Letters Patent is hereby corrected as shown below:

In the Claims

Column 12, Line 9 (Claim 18):
Insert a letter --s-- after the letter "n" at the end of the word "configuration".

Signed and Sealed this
Twenty-first Day of February, 2023

Katherine Kelly Vidal
*Director of the United States Patent and Trademark Office*